United States Patent [19]

Marrs et al.

[11] 3,717,617
[45] Feb. 20, 1973

[54] HIGH PEEL STRENGTH POLYSULFIDE BASED SEALANTS

[75] Inventors: Oren L. Marrs; Moses L. Thomas, both of Bartlesville, Okla.

[73] Assignee: Phillips Petroleum Company, Bartlesville, Okla.

[22] Filed: July 8, 1970

[21] Appl. No.: 53,314

[52] U.S. Cl. ..........260/75 S, 117/124 E, 117/123 D, 117/132 B, 161/187, 260/79
[51] Int. Cl. .............................................C08g 43/00
[58] Field of Search.........................260/75 S, 481, 79

[56] References Cited

UNITED STATES PATENTS

| | | | |
|---|---|---|---|
| 3,297,473 | 1/1967 | Bulbenko | 260/824 X |
| 3,312,669 | 4/1967 | Giordano | 260/33.4 X |
| 3,317,461 | 5/1967 | Plueddemann | 260/824 X |
| 3,372,083 | 3/1968 | Evans et al. | 161/190 |
| 3,376,188 | 4/1968 | Clayton et al. | 161/193 |
| 3,487,043 | 12/1969 | Grudus | 260/41 |
| 3,493,461 | 2/1970 | Sterman et al. | 161/93 |

FOREIGN PATENTS OR APPLICATIONS 6,511,722   3/1966   Netherlands

OTHER PUBLICATIONS

Kirchner, Adhesion 1969, (7) 257–260, 278–280.
Holtmann et al., Kunstoffe 58, 955–960 (1968).
Becker, Plaste Kaut. 14, 833 (1967).
Hertlein, Proc. Aniv. Conf., SBI, Reinf. Plast. Compos. Div. 25th 1970, 16-B.

*Primary Examiner*—Melvin Goldstein
*Attorney*—Young and Quigg

[57] ABSTRACT

The adhesive characteristics of cured sealant formulations based on polysulfide polymers are substantially improved by the incorporation of glycidyl trialkyloxysilanes. The glycidyl trialkyloxysilanes provide an extremely high peel strength for coatings on various substrates, especially aluminum. The amount of curing agent required is reduced when glycidyl trialkyloxysilanes are used as adhesion-promoting additives.

11 Claims, No Drawings

HIGH PEEL STRENGTH POLYSULFIDE BASED SEALANTS

BACKGROUND OF THE INVENTION

This invention relates to novel curable liquid polythiol based sealant compositions. In accordance with another aspect, this invention relates to processes for bonding liquid curable polythiol compound based sealant compositions to structural element substrates. In accordance with a further aspect, this invention relates to the use of adhesion-promoting additives comprising glycidyl trialkyloxysilanes which substantially improve the adhesion of cured sealant formulations based on polysulfide polymers.

Sealing compositions that can be applied by one of various means, e.g., hand trowel or extrusion guns, to gaps between component parts of buildings and aircraft, for example, and shaped to conform to the surfaces of the joints, are used in large quantities in the building and engineering industries. Among the sealing compositions available to those industries are compositions that undergo a chemical change after being used to fill a joint such that there results a rubbery seal resistant to oil and gasoline and the weather. One type of sealing composition that undergoes such a chemical change and is at present available is supplied in two parts that are mixed together shortly before use, one of the parts comprising liquid curable polythiol and the other a curing agent for the polymer. However, cured polysulfide polymer based sealants do not readily adhere to the wide range of surfaces against which it is desired to bring it into contact for joint sealing purposes. The adhesives qualities of polysulfide polymers are such as to usually require the use of an adhesion-promoting additive in the uncured polythiol based sealant composition in order to ensure a good bonding of the cured sealant to the substrate.

In accordance with the invention, it has been found that glycidyl trialkyloxysilanes are excellent adhesion-promoting additives for curable liquid polythiol based sealant and caulking compositions whereby cured polysulfide polymer based sealants having extremely high peel strength are obtained.

Accordingly, an object of this invention is to provide a novel liquid curable polythiol based caulking or sealant composition which will allow for the attainment of a strong and lasting bonding of the cured sealant to substrates to be treated therewith.

Another object of this invention is to provide a process whereby curable liquid polythiol based sealant and caulking composition can be used so as to attain a strong and lasting bond of the cured polysulfide polymer containing compositions to substrates treated therewith.

A further object of this invention is to provide an adhesion-promoting additive for curable liquid polythiol compound based sealants which increases the peel strength for the sealant-to-substrate bond.

Other aspects, objects and the several advantages of this invention will be apparent to those skilled in the art from a study of this disclosure and the appended claims.

SUMMARY OF THE INVENTION

In accordance with the invention, glycidyl trialkyloxysilanes are incorporated into curable liquid polythiol compound based sealant and caulking compositions to improve the adhesive characteristics of these compositions upon subjecting same to cure.

In accordance with a specific embodiment of the invention, the glycidyl trialkyloxysilanes are added to poly(oxyalkylene)-polyester-poly(monosulfide)-polythiols having at least three pendent thiol groups per molecule, which compounds are formed by reacting a mercaptoalkanoic acid and, optionally, also a thiodialkanoic acid with a poly(oxalkylene)-polyol having at least three pendent hydroxy groups per molecule.

DESCRIPTION OF THE PREFERRED EMBODIMENT

The glycidyl trialkyloxysilanes of the invention can be represented as follows:

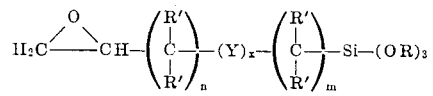

wherein Y is O or S; wherein n is an integer in the range of 1–5; wherein m is an integer in the range of 1–5; wherein x is in the range of 0–1; wherein R' is hydrogen or alkyl having in the range of one–5 carbon atoms, and wherein the total carbon atoms in all R' groups per molecule is equal to or less than 10; wherein R is alkyl having in the range of one–five carbon atoms.

Illustrative glycidyl trialkloxysilanes falling within the scope of the formula defined above include gamma-glycidoxypropyltrimethoxysilane, glycidoxymethyltrimethoxysilane, glycidylthiomethyltrimethoxysilane, gamma-ethyl-delta- (3-ethyl4-glycidyl-2,2,3-trimethyl-nonayloxymethyl)-beta,beta,gamma-trimethylnonyl-tripentyloxysilane, gamma-ethyl-delta-(3-ethyl-4-glycidyl-2,2,3-trimethylnonylthiomethyl)-beta,beta,gamma-trimethylnonyltripentyloxysilane, gamma-glycidylthiopropyltrimethoxysilane, and the like.

The adhesion-promoting additive of the present invention, i.e., the glycidyl trialkyloxysilane, can be incorporated into any of the known polythiol compounds which are normally used to prepare polysulfide based sealants or caulking compositions. The amount of adhesive promoting additive of the invention employed will range from 0.5 to 10 parts by weight based on 100 parts of polythiol. The polythiol compounds are liquid organic molecules having in the range of about 2–40 thiol groups per molecule which are generally known to form polysulfide polymers upon curing. Preparation of suitable polysulfide polymers from polythiol compounds and use in sealants is well known in the art, and is set forth in U.S. Pat. Nos. 3,297,473 and 3,312,669.

The invention is particularly applicable to improving the adhesive characteristics of sealants based on curable poly(oxyalkylene)-polyester-poly(monosulfide)-polythiols having at least three pendent thiol groups per molecule which are formed by reacting a mercaptoalkanoic acid and a thiodialkanoic acid with a poly(oxyalkylene)-polyol having at least three pendent hydroxy groups per molecule.

The mercaptoalkanoic acids which can be employed according to the process set forth in said copending application are represented as follows:

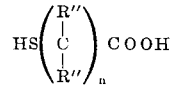

wherein R'' is H or alkyl having in the range of one–five carbon atoms, with a total of no more than 10 atoms in all R'' groups per molecule; and wherein $n$ is an integer in the range of 1–5.

Illustrative examples of mercaptoalkanoic acids or mercaptohydrocarboncarboxylic acids that can be employed according to the invention include 2-mercaptoethanoic acid, 3-mercaptopropionic acid, 4-mercaptobutyric acid, 6-mercaptohexanoic acid, 6-mercaptoundecanoic acid, 6-mercapto-6-(2,2-dimethylpropyl)undecanoic acid, 6-mercapto-2-(2,2-dimethylpropyl)undecanoic acid, 2-mercapto-2-methylheptanoic acid, 3,3-dimethyl-6-mercaptohexanoic acid, 6-mercapto-2,2,3,3,4,4,5,5,6-nonamethylheptanoic acid, and the like.

The thiodialkanoic acids which can be employed according to the process of said copending application are represented as follows:

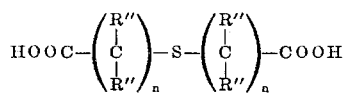

wherein R and n are as defined above; with a total of no more than 20 carbon atoms in all R groups per molecule.

Representative examples of such thiodialkanoic acids that can be employed according to the invention include thiodipropionic acid [3-(2-carboxyethylthio)propanoic acid], carboxymethylthioethanoic acid, 4-(3-carboxypropylthio)butanoic acid, 6-(5-carboxypentylthio)hexanoic acid, 6-[1-(4-carboxybutyl)hexylthio]undecanoic acid, 6-[1-(4-carboxybutyl)-1-(2,2-dimethylpropyl)hexylthio]-6-[2,2-dimethylpropyl]undecanoic acid, 6-(5-carboxy-7,7-dimethyloctylthio)-2-(2,2-dimethylpropyl)hexanoic acid, 2-(1-carboxy-1-methylhexylthio)-2-methylheptanoic acid, 6-(5-carboxy-4,4-dimethylpentylthio)-3,3-dimethylhexanoic acid, 6-(5-carboxy- 1,1,2,2,3,3,4,4,5-nonamethylhexylthio)-2,2,3,3,4,4,5,5,6-nonamethylheptanoic acid, and the like.

The poly(oxyalkylene)-polyols employed according to said copending application have at least three pendent hydroxy groups per molecule. Such polyhydroxy polyethers or poly(oxyalkylene)-polyols preferably have 3 to about 12 hydroxy groups per molecule and molecular weights of from about 200 to about 20,000. These materials can be produced by the reaction of one or more epoxy-substituted hydrocarbons of the general formulas:

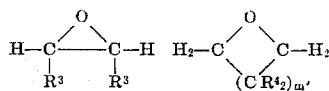

with a polyol of the general formula:

wherein either $R^3$ can be H or alkyl with the total number of carbon atoms in the molecule being in the range of up to and including about 20; wherein $R^4$ can be alkyl or H with the total number of carbon atoms per molecule being in the range of up to and including about 20; and wherein $m'$ can be an integer of from 1 to about 10, preferably 1 to 3; and wherein $Y'$ can be a hydrocarbon moiety with three to 40 carbon atoms per moiety and a valence equal to the value of $x'$, $x'$ is an integer from 3 to about 20, and the number of carbon atoms per molecule of $Y'(OH)_{x'}$ is equal to or greater than $x'$.

Polyols that are employed in the preparation of the poly(oxyalkylene)-polyols or polyhydroxy polyethers comprise hydroxy-substituted hydrocarbons that are preferably saturated aliphatics, saturated cycloaliphatics, aryls, or combinations thereof that are substituted with at least three hydroxyl groups per molecule. In the presently preferred embodiment, these polyols, $Y'(OH)_{x'}$, can have up to about 12 hydroxyl groups per molecule, and can contain from 3 to about 20 carbon atoms per molecule. Illustrative of the polyols that can be represented by the general formula, $Y'(OH)_x$, are glycerine, pentaerythritol, erythritol, 1,3,8-trihydroxycyclododecane, estriol, 1,4,5,8-naphthalenetetrol, di(p-hydroxyphenyl)phenylmethanol, 1,2,6-hexanetriol, 1,2,4,6,7,9,12,14,15,17,19,20 the like.

The poly(oxalkylene)-polyols or polyhydroxy polyethers can be prepared by contacting a polyol of the formula $Y'(OH)_{x'}$, as defined above, with an epoxy-substituted hydrocarbon, as defined above, under suitable polymerization conditions, as is known to the art. For instance, glycerine can be contacted with an excess of propylene oxide (1,2-epoxypropane) under elevated pressure and in the presence of suitable polymerization promoters. Products of this type can also be obtained from commercial sources. Niax Polyol LHT–67 (a trademark) is a commercial product of this type.

Illustrative examples of the epoxy-substituted hydrocarbons of the above-defined formulas that can be employed with the polyols to form the poly(oxyalkylene)-polyols include 1,2-epoxypropane, 1,2-epoxyethane, 1,2-epoxydocosane, 10,11-epoxydocosane, 2,3-epoxy-4,5-dimethyldodecane, 1,3-epoxypropane, 1,12-epoxydodecane, 1,12-epoxy-2,11-dibutyldodecane, 1,4-epoxy-2-(2,2-dimethyltetradecyl)butane, and the like.

The curing or coupling agents for curable polythiol compounds which can be used to cure or couple the curable polythiol based sealant compositions of the invention include free oxygen-containing fluids such as, for example, air; organic peroxides and hydroperoxides such as, for example, di-tert-butyl peroxide and cumene hydroperoxide; metal oxides such as, for example, the oxides of lead, zinc, manganese, calcium, barium, copper, mercury, tin, and iron; metal salts of carboxylic acids such as, for example, lead stearate, zinc laurate, zinc acetate; ammonium persulfate; and the like. Of the above curing agents, the metal oxides are the presently preferred materials. The curing time will vary with the polythiol, the curing agent, the sealant formulation, and the temperature. In general, sufficient curing agent is employed to convert at least about 40 percent of the pendent thiol groups to polysulfide groups, when using the poly(oxyalkylene)-polyester-polythiols defined above. Generally, about 2.5 to 7.5 parts by weight of one or more such curing agents should be used according to the present invention per 100 parts by weight of liquid polythiol compound being used. With the novel sealant compositions and processes of the present invention, a strong bonding of the cured sealant composition to the substrate can be obtained in about 24 to 72 hours at room temperature.

The curable compositions of the present invention can also contain various types of inert materials commonly employed in polysulfide based sealant and caulking compositions such as fillers, plasticizers, pigments, ultraviolet light stabilizers, cure accelerators, and the like. Representative examples of the above type of compounds include calcium carbonate, titanium oxide, silica, tris-(dimethylamino)phenol, carbon black, dibutyl phthalate, chlorinated hydrocarbons, sulfur, alumina, polyethylene, polystyrene, zirconia, and the like.

It is to be understood that treating one or more substrates by means of the novel processes and/or compositions disclosed herein includes providing such substrates with protective coatings of cured compositions of the present invention and/or filling voids between and/or bonding together two or more substrates, which substrates may or may not be composed of the same material. The substrates to be thus treated include those of wood, stone and concrete, those of a siliceous nature such as glass, those of a metallic nature such as aluminum, iron, and steel as well as zinc and/or chrome-coated iron or steel, and synthetic polymers such as polyvinyl fluoride, polyvinyl chloride, polystyrene, and the like.

EXAMPLE I

The peel strengths of sealant compositions formed from poly(oxalkylen)-polyester-poly(monosulfide)-polythiols were compared with various adhesive additives, all of which were silane compounds including a glycidyl trialkyloxysilane of the invention. The poly(oxyalkylene)-polyester-poly(monosulfide)-polythiol prepared, which is curable to a sealant, was formed as the reaction of a mercaptoalkanoic acid, a thiodialkanoic acid, and a poly(oxyalkylene)-polyol. The polythiol was specifically prepared by reacting Niax LHT-34 (a trademark for a polyol derived from 1,2,6-hexanetriol and propylene oxide, having a molecular weight of about 4,500 and a hydroxyl number of about 34) with a mixture of 3-mercaptopropionic acid and thiodipropionic acid.

A total of 480 g of Miax LHT-34 and a total of 90 g of the mixed acid product prepared above (1 equivalent of carboxy groups per 1.1 equivalents of hydroxyl groups) were charged to a reactor with 6 g of para-toluenesulfonic acid and 400 ml of xylene. Heat was applied for a period of 5.5 hours and the water of reaction was azeotroped at reflux temperatures. The reaction product was treated with ammonium hydroxide solution to remove any unreacted acid and filtered. The filtrate was concentrated to give 464 g of product which contained 1.24 weight percent thiol groups and had an acid number of 5.84 mg of KOH per gram of sample. The acid number was reduced further by dissolving the polymer in xylene, treating with lime, filtering, and concentrating the mixture again to isolate the polymer product which contained 1.19 weight percent thiol groups and had an acid number of 1.01 mg of KOH per gram of sample.

The material prepared above was combined in a three-roll paint mill with further ingredients of a sealant formulation according to the following recipe:

| | |
|---|---|
| Poly (oxyalkylene)-polyester-poly(monofulfide)-polythiol | 100 parts |
| CaCO$_3$ | 50 parts |
| TiO$_2$ | 50 parts |
| Silica, fumed | 5 parts |
| tris-(dimethylamino)phenol | 1 part |
| Aroclor 1254 (1) | 10 parts |
| Sulfur | 0.1 part |

(1) A trade name for a polychlorinated diphenyl, a yellow tinted viscous oil having a distillation range of 365–390°C.

The sealant formulation was divided into equal portions and cured with lead peroxide curing agent and added silane adhesion promoter. The ratio of poly(oxyalkylene)-polyester-poly(monosulfide)-polythiol to curing agent to adhesion promoter was 100:3.75:3 parts, respectively, in each run. Peel samples were prepared by forming a laminate of canvas/sealant/aluminum and then allowing the mixture to cure 7 days at about 25° C. The canvas was peeled from the aluminum at a 180° angle. The silanes, peel strength, and locus of failure were:

| Run No. | Silane | Peel Strength S PIW* | Locus of Failure |
|---|---|---|---|
| 1 | Vinyltrimethoxysilane | 1.85 | Sealant To al. |
| 2 | gama-Methacryloxypropyltrimethoxysilane | 2.8 | " |
| 3 | beta-(3,4-epoxycyclohexyl)ethyl-trimethoxysilane | 1.8 | " |
| 4 | gamma-Mercaptopropyltrimethoxysilane | 3.7 | " |
| 5 | gamma-Glycidoxypropyl-trimethoxysilane | 12.1 | Sealant CCANVAS |

-* pounds per inch width

Since the cured formulation with gamma-glycidoxypropyltrimethoxysilane failed at the canvas-to-sealant interface, then outstanding adhesion occurs at the sealant-to-aluminum interface and has to be greater than 12.2 piw.

A glycidyl trialkyloxysilane such as gamma-glycidoxypropyltrimethoxysilane greatly and unexpectedly improves adhesion of cured sealant formulations based on a curable poly(oxyalkylene)-polyester-poly(monosulfide)-polythiol based formulation which is cured with lead dioxide when compared with conventional coupling agents such as a vinyl trimethoxysilane, gamma-methacryloxypropyl-trimethoxysilane, beta-(3,4-epoxycyclohexyl)ethyltrimethoxysilane, and gamma-mercapto-propyltrimethoxysilane. Indeed, the gamma-glycidoxypropyltrimethoxysilane was the only coupling agent which made the cured sealant based on the poly(oxyalkylene)-polyester-polysulfide crosslinked polymer more adhesive to aluminum than to canvas.

EXAMPLE II

A poly(oxyalkylene)-polyester-polythiol compound was prepared by reacting Niax LHT-34 (a trademark for a polyol as defined in Example I) with 3-mercaptopropionic acid according to the method and under conditions as set forth in Example I.

Portions of this compound were mixed with Durez 10694, a liquid thermosetting, phenol-formaldehyde resin from Hooker Chemical Company, North Tonawada, New York (a conventional phenolic adhesive additive) and a glycidyl trialkyloxysilane adhesive promoter of the invention in a sealant formulation corresponding to that set forth as follows:

| Run With | Inventive Run | Phenolic Adhesion Promotor |
|---|---|---|
| Polythiol | 100 parts (wt.) | 100 parts |
| $CaCO_3$ | 40 parts | 40 parts |
| $TiO_2$ | 20 parts | 20 parts |
| Silica, fumed | 27 parts | 7 parts |
| Sulfur | 0.1 part | 0.1 part |
| Durez 10694 (a liquid phenol-formaldehyde resin | 0 parts | 5 parts |
| gamma-Glycidoxypropyltrimethoxy-silane | 5 parts | 0 parts |
| Curing mixture (4) | 15 parts | 15 parts |
| Adhesion Properties (1) | | |
| Dry Peel Strength | —(2) | 6.0 piw (3) |
| Wet Peel Strength | 10 piw (2) | 2.4 piw (3) |

(1) piw is pounds per inch width.
(2) fails from the canvas, thus good bonding to aluminum.
(3) fails from the aluminum.
(4) The curing mixture was 50 % by weight of lead dioxide and 50% by weight of dibutyl phthalate.

The above example clearly demonstrates that a glycidyl trialkyloxysilane such as gamma-glycidoxypropyltrimethoxysilane materially improved adhesion of cured sealants cured from formulations based on a poly(alkylene)-polyester-polythiol cured with lead dioxide when compared with conventional adhesion promoting agents such as a phenolic promoter.

EXAMPLE III

This example demonstrates the effectiveness of a glycidyl trialkyloxysilane adhesion promoter according to the invention utilized with a conventional polythiol known as Thiokol LP-32 polysulfide* (*A commercial product of the Thiokol Chemical Corporation, 780 N. Clinton Avenue, Trenton, N. J. 08607. Chemically LP-32 polysulfide polymer consists of repeating bis(ethyleneoxy)methane groups containing disulfide linkages. The polymer segments are terminated with reactive thiol groups; side thiol groups occur occasionally on the chain. The average structure may be presented thus: $HS(C_2H_1—O—CH_2—O—c_2H_4—S—S)_{23}—C_2H_4—O—CH_2—O—C_2H_4—SH)$.

A Thiokol LP-32 polysulfide polymer* (*A commercial product of the Thiokol Chemical Corporation, 780 N. Clinton Avenue, Trenton, N. J. 08607. Chemically LP-32 polysulfide polymer consists of repeating bis(ethyleneoxy)methane groups containing disulfide linkages. The polymer segments are terminated with reactive thiol groups; side thiol groups occur occasionally on the chain. The average structure may be presented thus: $HS(C_2H_1—O—CH_2—O—C_2H_2—S—S)_{23}—C_2H_4—O—CH_2—O—C_2H_4—SH)$ was used as a curable sealant base and Durez 10694, a liquid phenolic resin adhesion promoter, was added in one formulation and glycidyl trialkyloxysilane of the present invention was added in another formulation. The polythiol containing a phenolic adhesion promoter resulted in a very soft cured sealant composition which had very poor recovery properties. However, when the glycidyl trialkyloxysilane of the invention was used, a tough and strongly adhering sealant was obtained, upon cure.

The formulation and properties of the formulations are set forth below:

| | Formulation A | B |
|---|---|---|
| thiokol LP-32* | 100 g | 100 g |
| Arochlor 1254 | 30 g | 30 g |
| $CaCO_3$ | 40 g | 40 g |
| $TiO_{12}$ | 20 g | 20 g |
| Silica, fumed | 7 g | 7 g |
| Sulfur | 0.1 g | 0.1 g |
| tris-(dimethylamino)phenol | 1.2 g | 1.2 g |
| Durez 10694, a liquid phenol-formaldehyde resin adhesion promotor | — | 5 g |
| gamma-Glycidoxypropyltrimethoxysilane | 5 g | — |
| Curing Agent (50 weight per cent $PBO_2$, 50 weight per cent dibutyl phthalate) | 10 g | 15 g |
| Properties: | | |
| Elongation, % | 275 | 206 |
| Peel Strength to al. lbs. per inch width | | |
| dry | 22.5 | 8 |
| wet | 16 | 10.9 |

*A commercial product of the Thiokol Chemical Corporation, 780 N. Clinton Avenue, Trenton N.J. 08607. Chemically LP-32 polysulfide polymer consists of repeating bis(ethyleneoxy)methane groups containing disulfide linkages. The polymer segments are terminated with reactive thiol groups; side thiol groups occur occasionally on the chain. The average structure may be presented thus: $HS(C_2H_4—)O—CH_2—O_2H_4—S—S)_{23}—C_2H_4O—CH_2—C_2H_4—SH$ The superior peel strength and elongation of the cured sealant in Run A as compared to the cured sealant in Run B demonstrates the superior adhesion imparted to sealants based on commercial polythiols by the glycidyl trialkyloxysilanes of the instant invention. Less curing agent is also demonstrated to be needed for excellent properties.

EXAMPLE IV

A portion of poly(oxalkylene)-polyester-poly(monosulfide)-polythiol which was prepared in Example I was combined in a three-roll paint mill with further ingredients of a sealant formulation according to the following recipe:

| | Formulation A Parts by Wt. | B Parts by Wt. |
|---|---|---|
| Poly(oxyalkylene)-polyester-poly(monosulfide)-polythiol | 100 | 100 |
| $CaCO_3$ | 40 | 40 |
| $TiO_2$ | 20 | 20 |
| Silica (fumed) | 6 | 6 |
| Arochlor 1254 | 15 | 15 |
| Sulfur | 0.05 | 0.05 |
| gamma-Glycidoxypropyltri-methoxysilane | 0 | 3 |
| Curing Mixture | 7.5 | 7.5 |
| Properties of Cured Selant | | |
| 50% Modulus, psi | 38.4 | 93.7 |
| 100% Modulus, psi | 48.6 | 148.8 |
| Tensile break, psi | 124 | 277 |
| Peel strength, Al/Canvas, piw | | |
| dry | 4.5 | 12 |
| wet | 2 | 8.5 |

This example demonstrates that a cured sealant having improved properties is produced when gamma-glycidoxypropyltrimethoxysilane is employed in sealant formulations.

We claim:

1. A curable sealant composition comprising, in weight ratio, (a) 100 parts by weight of a curable liquid polythiol having pendent reactive thiol groups, (b) from 0.5–10 parts by weight of an adhesion promoting additive consisting essentially of a glycidyl trialkyloxysilane having the formula

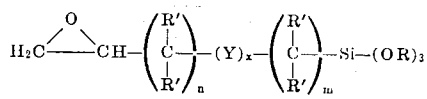

wherein Y is O or S, $n$ is an integer in the range of 1–5, $m$ is an integer in the range of 1–5, $x$ is in the range of 0–1, R' is hydrogen or alkyl having in the range of one to five carbon atoms, the total carbon atoms in all R' groups per molecule being equal to or less than 10, and wherein R is alkyl having in the range of one to five carbon atoms, and (c0 a curable amount of a curing agent for the polythiol which amount is sufficient to convert at least about 40 weight percent of the pendent reactive thiol groups to polysulfide groups.

2. A composition according to claim 1 wherein the polythiol is a poly(oxyalkylene)-polyester-poly(monosulfide)-polythiol having at least three pendent thiol groups per molecule formed by the reaction of a mercaptoalkanoic acid and a thiodialkanoic acid with a poly(oxyalkylene)-polyol having at least three pendent hydroxy groups per molecule.

3. A composition according to claim 2 wherein said glycidyl trialkyloxysilane is gamma-glycidoxypropyltrimethoxysilane and the curing agent is lead peroxide, the amount of curing agent present being in the range of 2.5 to 7.5 weight parts per 100 weight parts of polythiol.

4. An article of manufacture which is a substrate having on at least one surface thereof a layer, exhibiting a high peel strength bonded thereto, of the sealant composition of claim 1.

5. An article as defined in claim 4 in which said substrate is aluminum.

6. An article as defined in claim 5 wherein said polythiol is a poly(oxyalkylene)-polyester-poly(monosulfide)-polythiol having at least three pendent thiol groups per molecule formed by the reaction of a mercaptoalkanoic acid and a thiodialkanoic acid with a poly(oxyalkylene)-polyol having at least three pendent hydroxy groups per molecule, said glycidyl trialkyloxysilane is gamma-glycidoxypropyltrimethoxysilane, and the curing agent is lead peroxide.

7. An article as defined in claim 4 in which said substrate is concrete.

8. A composition according to claim 1 wherein said glycidyl compound is gamma-glycidoxypropyltrimethoxysilane and the curing agent is a metallic oxide.

9. A composition according to claim 1 wherein the polythiol is a poly(oxyalkylene)-polyester-polythiol having at least three pendent thiol groups per molecule formed by the reaction of a mercaptoalkanoic acid with a poly(oxyalkylene)-polyol having at least three pendent hydroxy groups per molecule.

10. An article of manufacture which is a substrate having on at least one surface thereof a layer, exhibiting a high peel strength bonded thereto, of the sealant composition of claim 2.

11. An article as defined in claim 10 in which said substrate is glass or aluminum. 14

* * * * *